US010275295B2

(12) United States Patent
Huang et al.

(10) Patent No.: US 10,275,295 B2
(45) Date of Patent: Apr. 30, 2019

(54) METHOD AND APPARATUS FOR PRESENTING CLIPBOARD CONTENTS ON A MOBILE TERMINAL

(71) Applicant: TENCENT TECHNOLOGY (SHENZHEN) COMPANY LIMITED, Shenzhen (CN)

(72) Inventors: Ying Huang, Shenzhen (CN); Bo Hu, Shenzhen (CN); Tingyong Tang, Shenzhen (CN); Zhipei Wang, Shenzhen (CN); Ruiyi Zhou, Shenzhen (CN); Xi Wang, Shenzhen (CN); Kai Zhang, Shenzhen (CN); Xin Qing, Shenzhen (CN); Huijiao Yang, Shenzhen (CN); Yulei Liu, Shenzhen (CN); Wei Li, Shenzhen (CN); Cheng Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 348 days.

(21) Appl. No.: 15/011,741

(22) Filed: Feb. 1, 2016

(65) Prior Publication Data
US 2016/0154686 A1 Jun. 2, 2016

Related U.S. Application Data

(63) Continuation of application No. PCT/CN2014/083499, filed on Aug. 1, 2014.

(30) Foreign Application Priority Data

Aug. 1, 2013 (CN) .......................... 2013 1 0332711

(51) Int. Cl.
*G06F 3/048* (2013.01)
*G06F 9/54* (2006.01)
(Continued)

(52) U.S. Cl.
CPC ............ *G06F 9/543* (2013.01); *G06F 3/0482* (2013.01); *G06F 3/0488* (2013.01);
(Continued)

(58) Field of Classification Search
CPC ...................................................... G06F 3/048
See application file for complete search history.

(56) References Cited

U.S. PATENT DOCUMENTS

| 2006/0015598 | A1  | 1/2006 | Olsen et al. |
| 2007/0083468 | A1* | 4/2007 | Wetherell ............ G06F 17/3089 |
|              |     |        | 705/51 |

(Continued)

FOREIGN PATENT DOCUMENTS

| CN | 102253928 A | 11/2011 |
| CN | 102314223 A | 1/2012  |

(Continued)

OTHER PUBLICATIONS

The World Intellectual Property Organization (WIPO) International Search Report for PCT/CN2014/083499 dated Oct. 27, 2014.
(Continued)

*Primary Examiner* — Xuyang Xia
(74) *Attorney, Agent, or Firm* — Anova Law Group, PLLC

(57) ABSTRACT

Methods and apparatus for presenting clipboard contents on a mobile terminal are provided herein. In an exemplary method, an input-method-control call-out request can be received. An input-method control including a clipboard function key can be displayed. The input-method control can include an input box. A triggering signal for triggering the clipboard function key can be received. A clipboard containing one or more copying items can be displayed.

16 Claims, 11 Drawing Sheets

(51) Int. Cl.
*G06F 3/0488* (2013.01)
*G06F 3/0482* (2013.01)
*G06F 3/0484* (2013.01)
*G06F 7/08* (2006.01)
*G06F 17/24* (2006.01)

(52) U.S. Cl.
CPC ............ *G06F 3/04842* (2013.01); *G06F 7/08* (2013.01); *G06F 17/24* (2013.01)

(56) References Cited

U.S. PATENT DOCUMENTS

| | | | | |
|---|---|---|---|---|
| 2007/0255694 | A1* | 11/2007 | Wu | G06F 17/30864 |
| 2008/0282180 | A1* | 11/2008 | Glasgow | G06F 9/543 |
| | | | | 715/770 |
| 2011/0197155 | A1* | 8/2011 | Lee | G06F 1/1616 |
| | | | | 715/770 |
| 2013/0191769 | A1* | 7/2013 | Park | G06F 3/0488 |
| | | | | 715/770 |
| 2013/0239034 | A1* | 9/2013 | Ota | G06F 3/04817 |
| | | | | 715/765 |
| 2013/0326371 | A1* | 12/2013 | Xu | G06F 3/0482 |
| | | | | 715/753 |
| 2015/0026620 | A1* | 1/2015 | Kwon | G06F 3/04845 |
| | | | | 715/770 |

FOREIGN PATENT DOCUMENTS

| | | |
|---|---|---|
| CN | 103020029 A | 4/2013 |
| CN | 103106026 A | 5/2013 |
| CN | 103543941 A | 1/2014 |
| EP | 2618250 A2 | 7/2013 |

OTHER PUBLICATIONS

The State Intellectual Property Office of the People's Republic of China (SIPO) Office Action 1 for 201310332711.4 dated Apr. 2, 2018 12 Pages (including translation).

* cited by examiner

METHOD AND APPARATUS FOR PRESENTING CLIPBOARD CONTENTS ON A MOBILE TERMINAL

CROSS-REFERENCES TO RELATED APPLICATIONS

This application is a continuation application of PCT Patent Application No. PCT/CN2014/083499, filed on Aug. 1, 2014, which claims priority to Chinese Patent Application No. 201310332711.4, filed on Aug. 1, 2013, the entire content of both of which is incorporated herein by reference.

FIELD OF THE DISCLOSURE

The present disclosure generally relates to the field of computer application technology and, more particularly, relates to methods and apparatus for presenting clipboard contents on a mobile terminal.

BACKGROUND

Windows operating system is mainly installed on a desktop personal computer (PC), and the desktop personal computer has input devices such as keyboard and mouse that are relatively convenient, so operations can be conveniently performed via the keyboard and the mouse. For example, by default, copy and paste operations can be performed by using a mouse right button or using hotkeys of the keyboard. For example, by default, the Windows operating system uses "CTRL+C" as a hotkey for the copy operation, and "CTRL+V" as a hotkey for the paste operation. Alternatively, an interface can be provided for a user to set his/her own hotkey according to his/her operation habits.

Conventionally, clipboard operations on a mobile device with a touch screen (such as a smart phone, a tablet PC, etc.) are performed in a similar manner to that in the Windows operating system. That is, copy and paste operations on the mobile device with the touch screen are accomplished via calling out a menu containing copy and paste menu items. Such an operating method is similar to the copy and paste operations via a mouse right-button menu in the Windows operating system. However, because the mobile terminal has a small screen and multiple moving scenes, considering various factors such as hardware and usage environment on the whole, such an operating method is relatively complex, invisibly increases the number of user operations, and shortens the standby time of the mobile device. Because the clipboard operation is an important aspect of mobile computer technology, technical solutions are needed to solve and/or improve the issues associated with the conventional clipboard operations on mobile devices.

The disclosed methods and systems are directed to solve one or more problems set forth above and other problems.

BRIEF SUMMARY OF THE DISCLOSURE

One aspect of the present disclosure includes methods for presenting clipboard contents on a mobile terminal. In an exemplary method, an input-method-control call-out request can be received. An input-method control including a clipboard function key can be displayed. The input-method control can include an input box. A triggering signal for triggering the clipboard function key can be received. A clipboard containing one or more copying items can be displayed.

Another aspect of the present disclosure includes apparatus for presenting clipboard contents on a mobile terminal. An exemplary apparatus can include a request-receiving unit, an input-method-control displaying unit, and a clipboard-displaying unit. The request-receiving unit can be configured to receive an input-method-control call-out request. The input-method-control displaying unit can be configured to display an input-method control comprising a clipboard function key. The input-method control can include an input box. The clipboard-displaying unit can be configured to receive a triggering signal for triggering the clipboard function key and to display a clipboard containing one or more copying items.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 6:
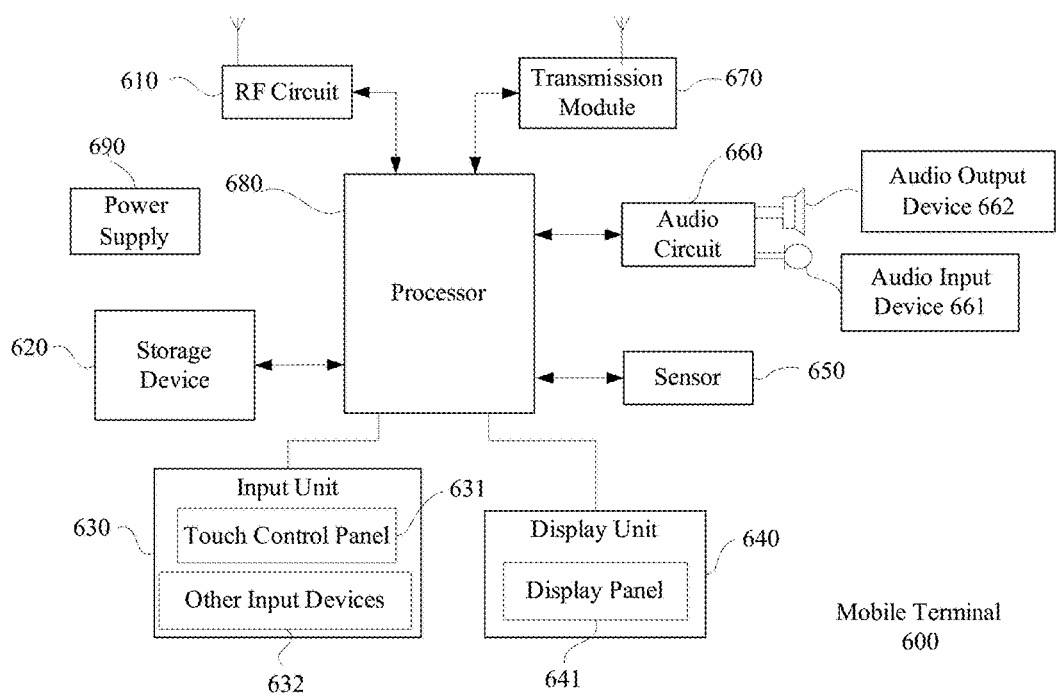
FIG. 6 depicts an exemplary mobile terminal consistent with the disclosed embodiments.

FIG. 6 depicts an exemplary mobile terminal consistent with the disclosed embodiments. The exemplary mobile terminal can include a mobile phone, a tablet computer, a PDA (personal digital assistant), a POS (point of sales), a car-carried-computer, or any desired terminal devices. As shown in FIG. 6, the exemplary mobile terminal 600 can include an RF (Radio Frequency) circuit 610, a storage device 620 including one or more computer-readable storage media, an input unit 630, a display unit 640, a sensor 650, an audio circuit 660, a transmission module 670, a processor 680 including one or more processing cores, a power supply 690, and/or other components. In various embodiments, the terminal(s) described herein can include more or less components as depicted in FIG. 6. Certain components/parts can be omitted, combined, replaced, and/or added.

The RF circuit 610 can be used to send/receive information or send/receive signal during communication. In particular, after receiving downlink information from a base station, such information can be processed by the one or more processors 680. Further, the data related to the uplink can be sent to the base station. Generally, the RF circuit 610 can include, but be not limited to, an antenna, at least one amplifier, a tuner, one or more oscillators, a user identity module (SIM) card, a transceiver, a coupler, LNA (i.e., Low Noise Amplifier), a duplexer, etc. In addition, the RF circuit 610 can communicate with other devices via a wireless communication network. The wireless communication can use any communication standards or protocols, including but not limited to, GSM (Global System for Mobile Communications), GPRS (General Packet Radio Service), CDMA (Code Division Multiple Access), WCDMA (Wideband encode Division Multiple Access), LTE (Long Term Evolution), e-mail, SMS (Short Messaging Service).

The storage device 620 can be used for storing software programs and modules, such as those software programs and modules corresponding to the method and apparatus as described in FIGS. 1-5 for presenting clipboard contents on a mobile terminal. By running software programs and modules stored in the storage device 620, the processor 680 can perform various functional applications and data processing to present clipboard items on a mobile terminal. The storage device 620 can include a program storage area and a data storage area. The program storage area can store the operating system, applications (such as sound playback, image playback, etc.) required by at least one function. The data storage area can store data (such as audio data, phone book, etc.) created when using the terminal. In addition, the storage device 620 can include a high-speed random access memory and a non-volatile memory. For example, the storage device 620 can include at least one disk memory, flash memory, and/or other volatile solid-state memory elements. Accordingly, the storage device 620 can further include a memory controller to provide the processor 680 and the input unit 630 with access to the storage device 620.

The input unit 630 can be used to receive inputted numeric or character information, and to generate signal input of keyboard, mouse, joystick, and trackball or optical signal input related to the user settings and function controls. Specifically, the input unit 630 can include a touch control panel 631 and other input device(s) 632. The touch-sensitive surface 631, also known as a touch screen or touch panel, can collect touch operations that a user conducts on or near the touch-sensitive surface 631. For example, a user can use a finger, a stylus, and any other suitable object or attachment on the touch-sensitive surface 631 or on an area near the touch-sensitive surface 631. The touch-sensitive surface 631 can drive a connecting device based on a preset program. Optionally, the touch control panel 631 can include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 680, and receive commands sent from the processor 680 to execute. Furthermore, the touch control panel 631 can be realized by resistive, capacitive, infrared surface acoustic wave, and/or other types of surface touch. In addition to the touch control panel 631, the input unit 630 can also include other input device(s) 632. Specifically, the other input device(s) 632 can include, but be not limited to, a physical keyboard, function keys (such as volume control buttons, switch buttons, etc.), a trackball, a mouse, an operating lever, or combinations thereof.

The display unit 640 can be used to display information inputted by the user, information provided to the user, and a variety of graphical user interfaces of the terminal 600. These graphical user interfaces can be formed by images, text, icons, videos, and/or any combinations thereof. The display unit 640 can include a display panel 641 configured by, e.g., LCD (Liquid Crystal Display), OLED (Organic Light-Emitting Diode), etc. Further, the touch control panel 631 can cover the display panel 641. When the touch control panel 631 detects a touch operation on or near the touch sensitive surface, the touch operation can be sent to the processor 680 to determine a type of the touch operation. Accordingly, the processor 680 can provide visual output on the display panel 641. Although in FIG. 6 the touch-sensitive surface 631 and the display panel 641 are shown as two separate components to achieve input and output functions, in some embodiments, the touch control panel 631 and the display panel 641 can be integrated to perform input and output functions.

The terminal 600 in FIG. 6 can further include at least one sensor 650, such as optical sensors, motion sensors, and other suitable sensors. Specifically, the optical sensors can include an ambient optical sensor and a proximity sensor. The ambient optical sensor can adjust brightness of the display panel 641 according to the brightness of ambient light. The proximity sensor can turn off the display panel 641 and/or turn on backlighting, when the terminal 600 moves to an ear. As a type of motion sensor, a gravity sensor can detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), and/or vibration recognition related functions (e.g., pedometer, percussion, etc.). The terminal 600 can also be configured with, e.g., a gyroscope, a barometer, a hygrometer, a thermometer, an infrared sensor, and/or other sensors.

The audio circuit 660 can include an audio input device 661 such as a microphone and an audio output device 662 such as a speaker and can provide an audio interface between the user and terminal 600. The audio circuit 660 can transmit an electrical signal converted from the received audio data to the speaker 661 to convert into audio signal output. On the other hand, the microphone 662 can convert the collected sound signal to an electrical signal, which can be received by the audio circuit 660 to convert into audio data. The audio data can be output to the processor 680 for processing and then use the RF circuit 610 to transmit to, e.g., another terminal. Alternatively, the audio data can be outputted to the storage device 620 for further processing. The audio circuit 660 can also include an earplug jack to provide communications between the peripheral headset and the terminal 600.

The terminal 600 can use the transmission module 670 to help users send/receive emails, browse websites, access streaming media, etc. The transmission module 670 can provide users with a wireless or wired broadband Internet access. In various embodiments, the transmission module 670 can be configured within or outside of the terminal 600 as depicted in FIG. 6.

The processor 680 can be a control center of the mobile terminal 600. The processor 680 can use a variety of interfaces and circuits to connect various parts, e.g., within a mobile terminal, can run or execute software programs and/or modules stored in the storage device 620, call the stored data in the storage device 620, and/or perform various functions and data processing of the mobile terminal 600, e.g., to monitor the overall mobile terminal. Optionally, the processor 680 can include one or more processing cores. In an exemplary embodiment, the processor 680 can integrate application processor with modulation and demodulation processor. The application processor is mainly used to process operating system, user interface, and applications. The modulation and demodulation processor is mainly used to deal with wireless communications. In various embodiments, the modulation and demodulation processor may or may not be integrated into the processor 680.

The terminal 600 can further include a power supply 690 (such as a battery) to power various components of the terminal. In an exemplary embodiment, the power supply can be connected to the processor 680 via the power management system, and thus use the power management system to manage charging, discharging, and/or power management functions. The power supply 690 can also include one or more DC or AC power supplies, a recharging system, a power failure detection circuit, a power converter or inverter, a power status indicator, and/or any other suitable components.

Although not shown in FIG. 6, the terminal 600 can further include a camera, a Bluetooth module, etc. without limitations.

The processor(s) 680 of the terminal 600 can upload executable files corresponding to processes of one or more programs to the storage device 620. The processor(s) 680 can then be used to run the one or more programs stored in the storage device 620. For example, the processor(s) 680 can at least be configured to receive an input-method-control call-out request, display an input-method control including a clipboard function key, display the input-method control including an input box, receive a triggering signal for triggering the clipboard function key, and display a clipboard containing one or more copying items.

In various embodiments, methods and apparatus for presenting clipboard contents on a mobile terminal are provided. Exemplary apparatus for presenting clipboard contents on a mobile terminal can be integrated in a client. The client can be installed on the mobile terminal. The mobile terminal can include, but is not limited to, smart phones, tablet computers, e-book readers, moving picture experts group audio layer III (MP3) players, moving picture experts group audio layer IV (MP4) players, PDA (personal digital assistant), POS (point of sales), car-carried-computer, or any other appropriate mobile devices. The mobile terminal can be any device as depicted in FIG. 6.

Various embodiments provide methods and apparatus for presenting clipboard contents on a mobile terminal. As used herein, clipboard contents refers to contents on a clipboard, which can include any appropriate information item copied and saved as an entry on a clipboard on a terminal device, such as a mobile terminal. An information item on the clipboard can also be referred to using various terms including, a clipboard content, a clipboard item, a copy content, a copying item, a clipping, a clipping content, a clipping item, a copy-and-paste content, a copy-and-paste item, or a clipping information item.

Figure 1:
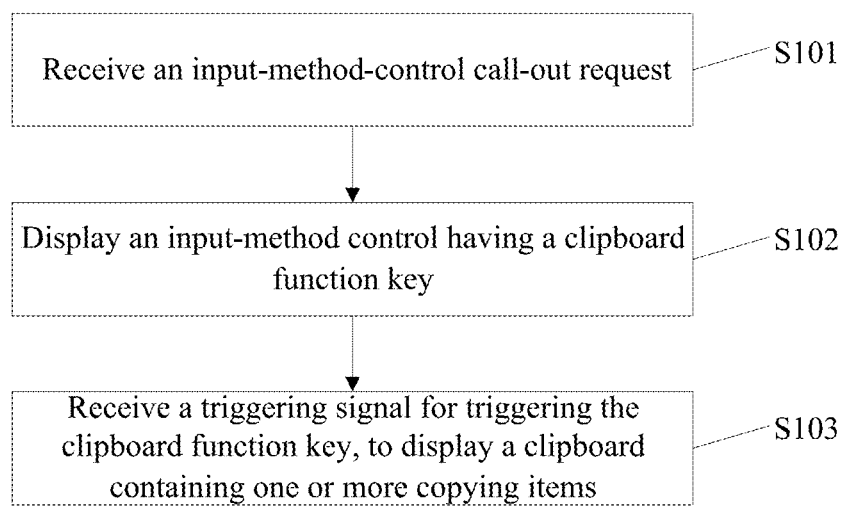
FIG. 1 depicts a flow diagram of an exemplary method for presenting clipboard contents on a mobile terminal in accordance with various disclosed embodiments.

FIG. 1 depicts a flow diagram of an exemplary method for presenting clipboard contents on a mobile terminal in accordance with various disclosed embodiments. As shown in FIG. 1, a method for presenting clipboard contents on a mobile terminal can include the following exemplary steps.

In Step S101, an input-method-control call-out request is received. The input-method-control call-out request on a mobile terminal can be pre-defined by an operating system or software installed on the mobile terminal. For example, in an Android system, an input-method control can be called out (i.e., invoked) by a finger single-clicking on an input box on a webpage, or single-clicking on a text-edit input box. As used herein, calling out a function or operation (e.g., control, interface, or menu) on a mobile terminal can refer to calling, launching, or invoking the specific function or operation, using any appropriate operating methods on the mobile terminal (e.g., certain key pressing, screen tapping/sliding, mouse clicking, and the like) when the mobile terminal is configured with an appropriate software program. As used herein, wherever applicable, 'call out' can be used interchangeably with 'invoke'.

In various embodiments, an input-method-control call-out request can refer to a request for calling out an input-method control. An input-method control can refer to a control that provides method(s) that a user can use for inputting information on a mobile device. The input-method control can be displayed on an interface, and can include one or more appropriate controls that enable the methods for inputting information on the mobile terminal. The one or more controls can include, but are not limited to, keyboard for inputting various numbers, letters, characters, and/or punctuation marks, an input box for displaying inputted contents, button(s) for switching between various keyboard input modes, button(s) for switching between typing and speech recognition, button(s) for editing and formatting inputted information, and/or the like.

In Step S102, an input-method control including a clipboard function key is displayed. When the input-method-control call-out request is received, the input-method control including the clipboard function key can be displayed.

Figure 3:
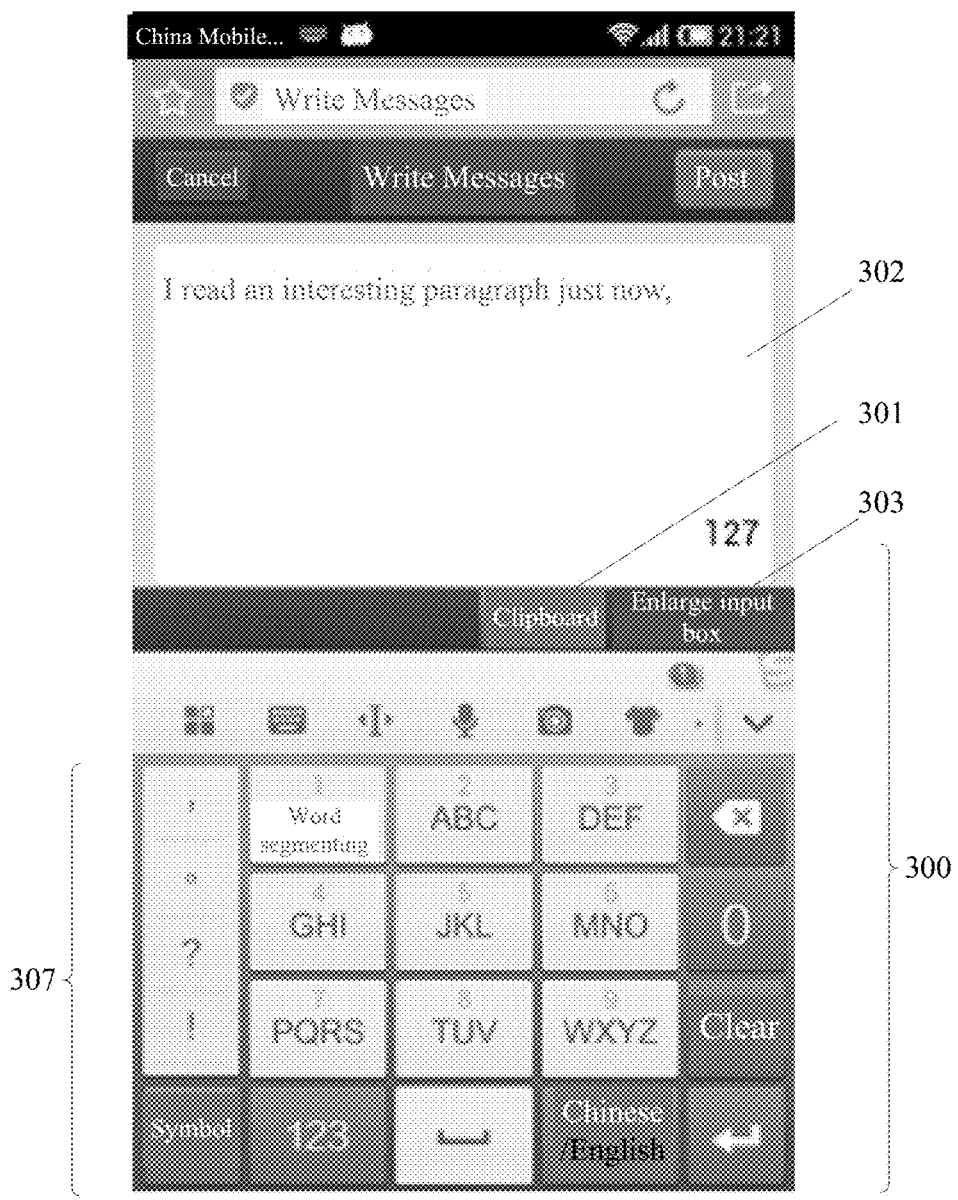
FIG. 3 depicts an exemplary input-method control including a clipboard function key in accordance with various disclosed embodiments.

For example, FIG. 3 depicts an exemplary input-method control including a clipboard function key in accordance with various disclosed embodiments. In FIG. 3, an interface of the application program 'Write Messages' is displayed. The application program 'Write Messages' can be configured such that a user of the mobile terminal can input contents such as text, and then post the contents in an appropriate manner. Referring to FIG. 3, the interface displays an input-method control 300 that the user can use for inputting the contents, and an input box 302. The input-method control 300 includes a clipboard function key 301, and various other optional controls such as a keyboard 307. Optionally, the input box 302 can be independent from, or be included as a part of the input-method control 300, without limitation. The input-method control 300 including the clipboard function key 301, as shown in FIG. 3, can be displayed.

Figure 4:
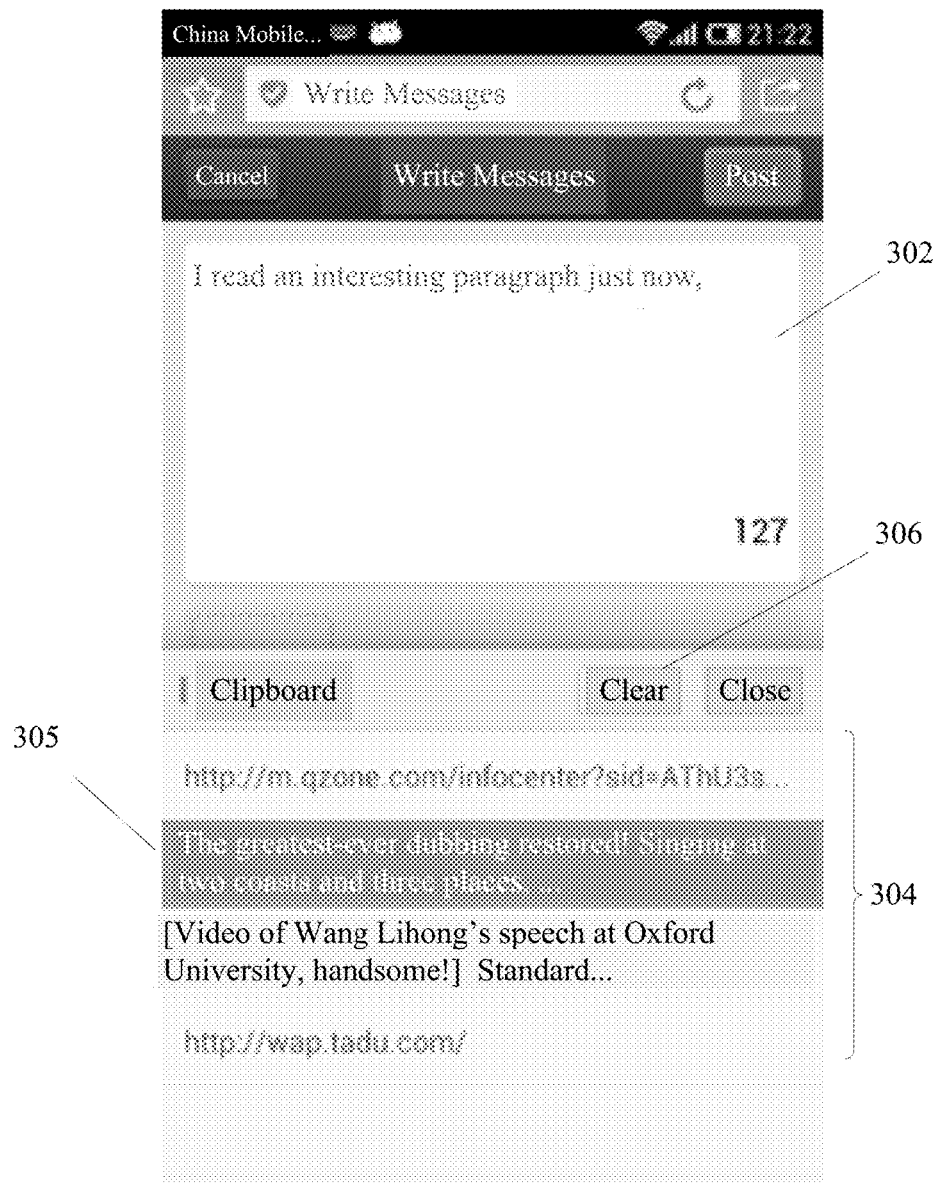
FIG. 4 depicts presenting a clipboard containing a plurality of copying items in accordance with various disclosed embodiments.

In Step S103, a triggering signal for triggering the clipboard function key is received, and a clipboard containing one or more copying items is displayed. For example, FIG. 4 depicts presenting a clipboard containing a plurality of copying items in accordance with various disclosed embodiments. The clipboard 304 containing multiple copying items, as shown in FIG. 4, can be displayed. In various embodiments, a triggering signal for triggering the clipboard function key can include clicking on the clipboard function key 301 as shown in FIG. 3.

A copy-and-paste menu is conventionally called out by double-clicking on an edit box (i.e., a text edit box), and the double-clicking operation includes two clicks. In various embodiments as disclosed herein, an input-method control including a clipboard function key can be called out directly by single-clicking on an edit box. Thus, the single-clicking operation during the calling out can include just one click. Thus, the number of user operations can be reduced.

Further, copying and pasting via a clipboard can by itself be a method for inputting information. An inputting or editing operation can usually be performed via the input-method control after a pasting operation is performed. In addition, during the inputting or editing operation, copying items often need to be selected from the clipboard to perform a pasting operation. Therefore, by directly binding the clipboard function key with the input-method control, the number of user operations can be further reduced.

In various embodiments, a clipboard function key can be directly bound with the input-method control. When an input-method-control call-out request is received, the clipboard function key can be displayed. Thus, efficiency of a user for operating a mobile terminal can be improved, the number of user operations can be reduced, and lifetime or battery lifetime of the mobile terminal can accordingly be extended.

Figure 2:
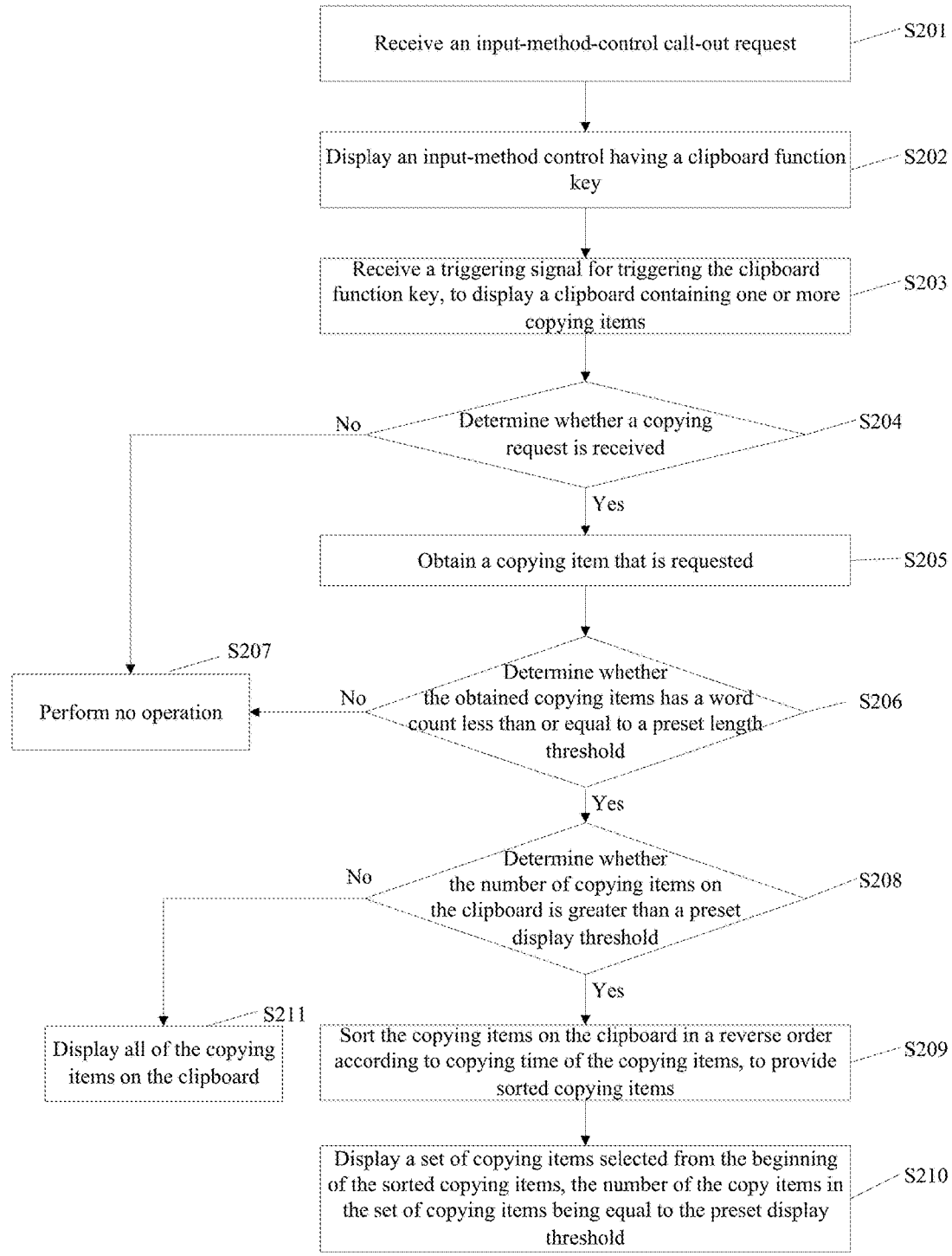
FIG. 2 depicts a flow diagram of another exemplary method for presenting clipboard contents on a mobile terminal in accordance with various disclosed embodiments.

FIG. 2 depicts a flow diagram of another exemplary method for presenting clipboard contents on a mobile terminal in accordance with various disclosed embodiments. As shown in FIG. 2, a method for presenting clipboard contents on a mobile terminal can include the following exemplary steps.

In Step S201, an input-method-control call-out request is received. In Step S202, an input-method control including a clipboard function key is displayed.

In Step S203, a triggering signal for triggering the clipboard function key is received, and a clipboard containing one or more copying items is displayed. In Step S204, it is determined whether a copying request is received. When the copying request is received, Step S205 is performed. When the copying request is not received, Step S207 is performed.

In Step S205, a copying item that is requested is obtained. The copying item that is requested by the copying request can be an item that the user desires to copy and use. In Step S206, it is determined whether the obtained copying item has a word count less than or equal to a preset length threshold. When the obtained copying item has a word count less than or equal to the preset length threshold, Step S208 is performed. In this case, the obtained copying item can be copied and added to the clipboard. The clipboard can be re-displayed. When the obtained copying item has the word count greater than the preset length threshold, Step S207 is performed.

In Step S207, no operation is performed. The process for presenting clipboard contents on a mobile terminal is completed. As used herein, the word count can include any appropriate count that indicates the length of the copying item, or required storage space for the copying item. For example, the word count can include a count of words, a count of characters, a count of letters and numbers, number of bytes, and/or any other appropriate count.

In Step S208, it is determined whether the number of copying items on the clipboard is greater than a preset display threshold. When the number of the copying items on the clipboard is greater than the preset display threshold, Step S209 is performed. When the number of the copying items on the clipboard is not greater than the preset display threshold, Step S211 is performed.

In Step S209, optionally, the copying items on the clipboard are sorted in a reverse order according to copying time(s) of the copying items, to provide sorted copying items. Step S209 can be performed at any appropriate time before Step S208 or after Step S208, without limitation. As used herein, a copying time of the copying item refers to the time and/or date when the copying item is copied.

In Step S209, optionally, the copying items on the clipboard can be sorted according to other aspects of the copying items, not limited to the copying times. For example, the copying items on the clipboard can be sorted according to the length or word count of the copying items.

In Step S210, a set of copying items on the clipboard is displayed, the number of the copying items in the set of copying items being equal to the preset display threshold. The process for presenting clipboard contents on a mobile terminal is thus completed.

When the copying items on the clipboard is previously sorted, a set of copying items selected from the beginning of the sorted copying items can be displayed, the number of the copying items in the set of copying items being equal to the preset display threshold. For example, when the copying items on the clipboard are sorted in a reverse order according to the copying time of the copying items (e.g., as described in Step S209), a set of copying items selected from the beginning of the sorted copying items according to the latest copying time of the clipboard can be displayed, the number of the copying items in the set of copying items being equal to the preset display threshold. That is, the copying item having the latest copying time can be at the beginning of the sorted copying items.

Thus, a copying item can be added to the clipboard. The clipboard can be re-displayed, such that the added copying item can be displayed on the clipboard.

In Step S211, all of the copying items on the clipboard are displayed. The process for presenting clipboard contents on a mobile terminal is thus completed.

Thus, a copying item can be added to the clipboard. The clipboard can be re-displayed, such that the added copying item can be displayed on the clipboard.

After Step S203, the method can further include the following steps. When an input box for inputting text is in an edit-activated state, when a copying item (i.e., a selected copying item) on the clipboard receives a preset paste-triggering signal, the selected copying item can be pasted into the input box. The input box can include, e.g., an input box on a webpage, a text-edit input box, or any other appropriate input box. An edit-activated state can refer to a state in which the content displayed in the input box is currently being edited. In the edit-activated state, the contents displayed in the input box can be added, deleted, or processed in any other appropriate way.

In one example, a copying item 305 as shown in FIG. 4 can be selected (e.g., by clicking on copying item 305). When the preset paste-triggering signal is received, the copying item 305 can be pasted at any position indicated by a cursor in an input box 302 in FIG. 4. In various embodiments, the preset paste-triggering signal can include double-clicking on the selected copying item, long pressing, or any other appropriate preset signal for indicating the user's command for pasting the selected copying item.

Further, after the input-method-control call-out request is received, the method can further include the following steps. An input-method control including an input-box function key can be displayed. A triggering signal for triggering the input-box function key can be received, to enlarge the input box. For example, the input-box function key can include a button or key for enlarging the input box, such as an 'enlarge input box' key 303 shown in FIG. 3. A triggering signal for triggering the input-box function key can include the user clicking on the 'enlarge input box' key 303. After the triggering signal for triggering the input-box function key is received, the input box can be enlarged (not shown).

Further, after Step S203, the method can further include the following steps. When a copying item on the clipboard receives a preset delete-triggering signal, the copying item can be deleted from the clipboard. The clipboard can be re-displayed. The preset delete-triggering signal can include double-clicking on the selected copying item, long pressing, or any other appropriate preset signal for indicating the user's command for deleting the selected copying item. Additionally or alternatively, when the clipboard receives a preset clear-triggering signal, all of the copying items on the clipboard can be deleted. The clipboard can be re-displayed. For example, a 'clear' key 306 is shown in FIG. 4. By clicking on the 'clear' key 306, a preset clear-triggering signal can be received and all of the copying items on the clipboard 304 can be deleted.

In various embodiments as disclosed above (e.g., as shown in FIG. 2), before a clipping information item is saved on the clipboard, it can be first determined whether the clipboard satisfies a condition for loading the clipping information item. The condition can be, e.g., whether the number of clipping information items on the clipboard is less than or equal to a preset total number. When the clipboard does not satisfy the condition for loading the clipping information item, at least one clipping information item can be deleted from the clipboard according to a pre-set rule. Thus, the clipping information item can be saved on the clipboard after the clipboard satisfies the condition for loading the clipping information item.

Compared with the methods as described in various other embodiments (e.g., as shown in FIG. 1), the method as described in the embodiments as disclosed above (e.g., as shown in FIG. 2) can improve the efficiency of copying and pasting using the clipboard. Accordingly, the efficiency of the user selecting multiple copying items on the clipboard can be further improved. The number of sliding operations, when the user looks for the copying items, can be reduced. Thus, lifetime of the mobile terminal can be further extended.

Figure 5:
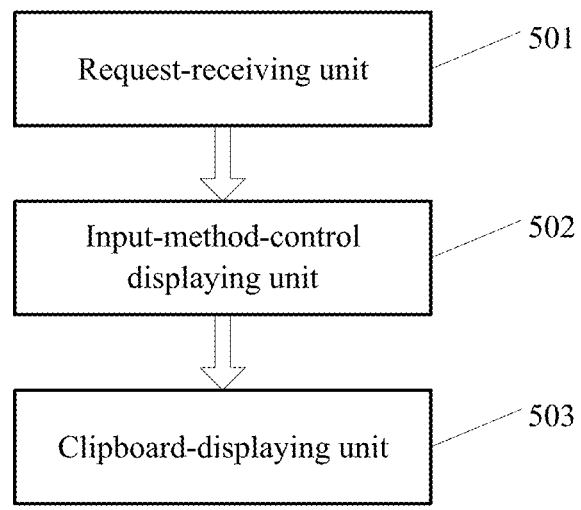
FIG. 5 depicts a structure diagram of an exemplary apparatus for presenting clipboard contents on a mobile terminal in accordance with various disclosed embodiments.

Accordingly, various embodiments also provide an apparatus for presenting clipboard contents on a mobile terminal. FIG. 5 depicts a structure diagram of an exemplary apparatus for presenting clipboard contents on a mobile terminal in accordance with various disclosed embodiments. As shown in FIG. 5, an apparatus for presenting clipboard contents on a mobile terminal can include a request-receiving unit 501, an input-method-control displaying unit 502, and/or a clipboard-displaying unit 503. Certain units may be omitted and other units may be included.

The request-receiving unit 501 is configured to receive an input-method-control call-out request. In various embodiments, a clipboard function key can be directly bound with the input-method control. When the input-method-control call-out request is received, the clipboard function key can be displayed. Thus, efficiency of a user for operating a mobile terminal can be improved, the number of user operations can be reduced, and lifetime of the mobile terminal can accordingly be extended.

The input-method-control displaying unit 502 is configured to display an input-method control including a clipboard function key. When the input-method-control call-out request is received, the input-method control including the clipboard function key can be displayed. For example, an input-method control including a clipboard function key, as shown in FIG. 3, can be displayed.

The clipboard-displaying unit 503 is configured to receive a triggering signal for triggering the clipboard function key and display a clipboard containing one or more copying items. For example, a clipboard containing multiple copying items, as shown in FIG. 4, can be displayed.

It is to be noted that a copy-and-paste menu is conventionally called out by double-clicking on an edit box, and the double-clicking operation includes two clicks. In various embodiments as disclosed herein, an input-method control including a clipboard function key can be called out directly by single-clicking on an edit box. Thus, the single-clicking operation during the calling out can include just one click. Thus, the number of user operations can be reduced.

Further, copying and pasting via a clipboard can by itself be a method for inputting. An inputting or editing operation can usually be performed via the input-method control after a pasting operation is performed. In addition, during the inputting or editing operation, copying items often need to be selected from the clipboard to perform a pasting operation. Therefore, by directly binding the clipboard function key with the input-method control, the number of user operations can be further reduced.

Further, the clipboard-displaying unit 503 is configured to paste selected copying item into the input box, when the input box for inputting text is in an edit-activated state, when a copying item on the clipboard receives a preset paste-triggering signal. The input box can include, e.g., an input box on a webpage, a text-edit input box, or any other appropriate input box. Further, the input box on the webpage, or the text-edit input box, can be an input box that is enlarged.

Further, the clipboard-displaying unit 503 is configured to, when a copying item on the clipboard receives a preset delete-triggering signal, delete the copying item from the clipboard and re-display the clipboard. Additionally or alternatively, the clipboard-displaying unit 503 is configured to, when the clipboard receives a preset clear-triggering signal, delete all of the copying items on the clipboard and re-display the clipboard.

Optionally, the clipboard-displaying unit 503 is further configured to, when a copying request is received, obtain a copying item that is requested. In this case, the clipboard-displaying unit 503 is further configured to add the copying item to the clipboard, and re-display the clipboard.

Optionally, the clipboard-displaying unit 503 is further configured to, before adding the copying item to the clipboard, determine whether the obtained copying item has a word count less than or equal to a preset length threshold. When the obtained copying item has a word count less than or equal to the preset length threshold, the clipboard-displaying unit 503 can add the copying item to the clipboard, and re-display the clipboard.

Optionally, the clipboard-displaying unit 503 is further configured to determine whether the number of copying items on the clipboard is greater than a preset display threshold. When the number of the copying items on the clipboard is greater than the preset display threshold, the clipboard-displaying unit 503 can display a set of copying items having a number of the copying items equal to the preset display threshold of the clipboard. When the number of the copying items on the clipboard is not greater than the preset display threshold, the clipboard-displaying unit 503 can display all of the copying items of the clipboard.

Optionally, the clipboard-displaying unit 503 is further configured to receive a triggering signal for triggering the clipboard function key, and sort the copying items on the clipboard in a reverse order according to a copying time of the copying items to provide sorted copying items, i.e., the copying items after the sorting. The sorting can be performed automatically when the triggering signal for triggering the clipboard function key is received, or can be performed via a triggering signal for triggering a sorting process (e.g., clicking on a sorting key provided on the interface of the clipboard). The clipboard-displaying unit 503 can determine whether the number of the copying items on the clipboard is greater than a preset display threshold. When the number of the copying items on the clipboard is greater than the preset display threshold, the clipboard-displaying unit 503 can display a set of copying items selected from the beginning of the sorted copying items according to the latest copying time of the clipboard. A number of the copying items in the set of copying items can be equal to the preset display threshold. When the number of the copying items on the clipboard is not greater than the preset display threshold, the clipboard-displaying unit 503 can display all of the copying items of the clipboard.

In various embodiments, a clipboard function key can be bound with an input-method control. When an input-method-control call-out request is received, the clipboard function key can be displayed. Thus, efficiency of a user operating a mobile terminal can be improved, the number of user operations can be reduced, and lifetime of the mobile terminal can accordingly be extended.

In certain embodiments, methods for presenting clipboard contents on a mobile terminal are provided. In a device operating system or an application program, a clipboard can be configured to store and share a user's data and contents, such that the user can transfer and share information in various application programs or locations. In an exemplary method, one or more most recent copying items of the user can be stored, and thus can be retrieved and used conveniently as needed.

When a user inputs contents on a webpage or in a text edit box, the user often needs to copy contents from other locations or other pages, and paste the contents into a specific input box. In addition, sometimes an item that needs to be pasted is copied previously before multiple copy operations. Conventional mobile phones provide a copy function that can only retrieve the most recent copying item.

The method according to certain disclosed embodiments can provide a clipboard function to assist with the needs of copying and pasting generated during inputting contents. Each time when a user copies an item, the item can be stored on the clipboard. When the user needs to input contents in an arbitrary input box, a clipboard bar can emerge, e.g., on an upper image layer of an input-method control. The user can open a clipboard interface by clicking on a clipboard button, or by long pressing the input box and then selecting 'clipboard'. Then, on the clipboard interface, the user can select any entry on the clipboard, to paste the item of the entry to the input box.

In certain embodiments, a clipboard function can be provided in an operating system or an application program on a handheld device (e.g., mobile terminal). The provided clipboard can store information and contents from multiple times of inputting and copying by the user. Meanwhile, a clipboard bar can be attached to an input-method control, or a quick entrance to the clipboard can be provided when an input box is long pressed. Thus, during inputting of contents, a user can conveniently call the clipboard and quickly perform a pasting operation, in order to transfer information.

Via the disclosed method, the clipboard can greatly assist, optimize, and help with inputting contents on a handheld device by the user.

In certain embodiments, a clipboard can be called out via two exemplary interactive processes. In one embodiment, a clipboard can be called out by long pressing on an input box. On a mainstream handheld device having a touch screen, long pressing is a common basic operation. When the area of an input box (or any other appropriate areas for inputting contents) on the touch screen is long pressed, a long press menu can be expanded. The long press menu can thus provide a quick entrance to the clipboard. When the user clicks on the 'clipboard' option on the long press menu, the clipboard can be called out.

Figure 7A:
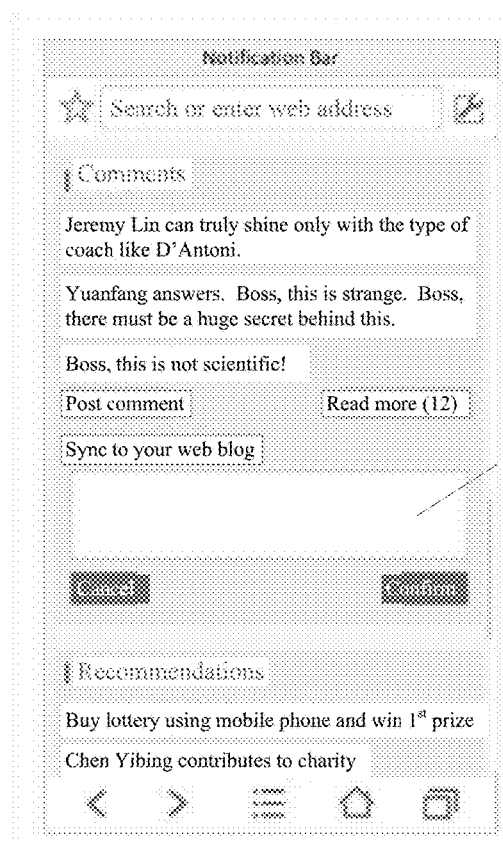
FIGS. 7A-7B depict exemplary interfaces for calling out a clipboard on a mobile terminal in accordance with various disclosed embodiments.
Figure 7B:
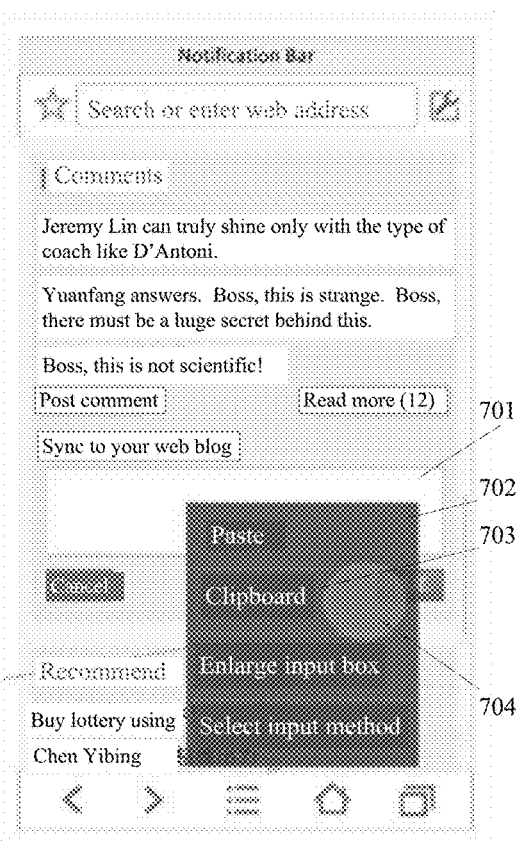

For example, FIGS. 7A-7B depict exemplary interfaces for calling out a clipboard on a mobile terminal in accordance with various disclosed embodiments. FIG. 7A depicts an interface having an input box 701. FIG. 7B depicts the interface after the user long presses the inbox 701. As shown in FIG. 7B, when the area of the input box 701 on the touch screen is long pressed, a long press menu 702 can be expanded. The long press menu 702 can thus provide a quick entrance to a clipboard. When the user clicks on a 'clipboard' option 703 on the long press menu, the clipboard can be called out. The position of the long press by the user is indicated by a dot 704 in FIG. 7B.

In another embodiment, a clipboard can be called out by being attached to or bound with an input-method control. The input-method keyboard can be called out by an operation of the user clicking on the input box. When the user clicks on the input box, the user may have a clear intention of inputting contents in the input box. Thus, an auxiliary entrance can be provided at the top of the input-method keyboard. The auxiliary entrance can be provided in the form of a bar or a button, such that the user can use the bar or button to call out and use the clipboard. The clipboard can thus become available at any time, as desired by the user. The user can thus operate more conveniently and at will.

Figure 8A:
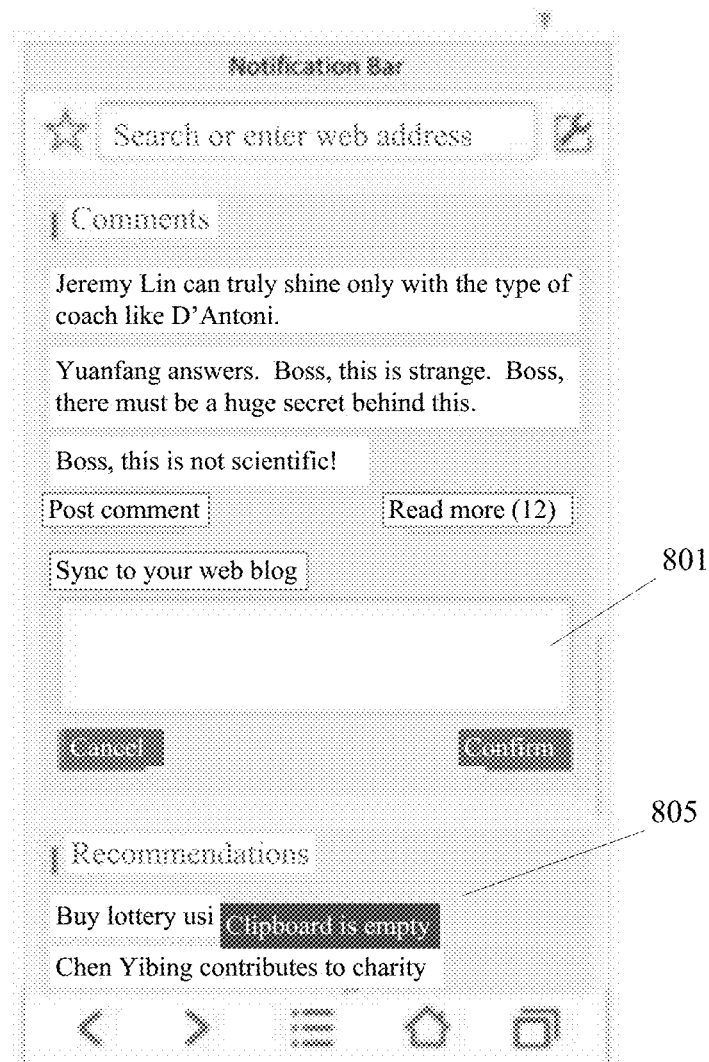
FIGS. 8A-8B depict exemplary interfaces for calling out a clipboard on a mobile terminal in accordance with various disclosed embodiments.
Figure 8B:
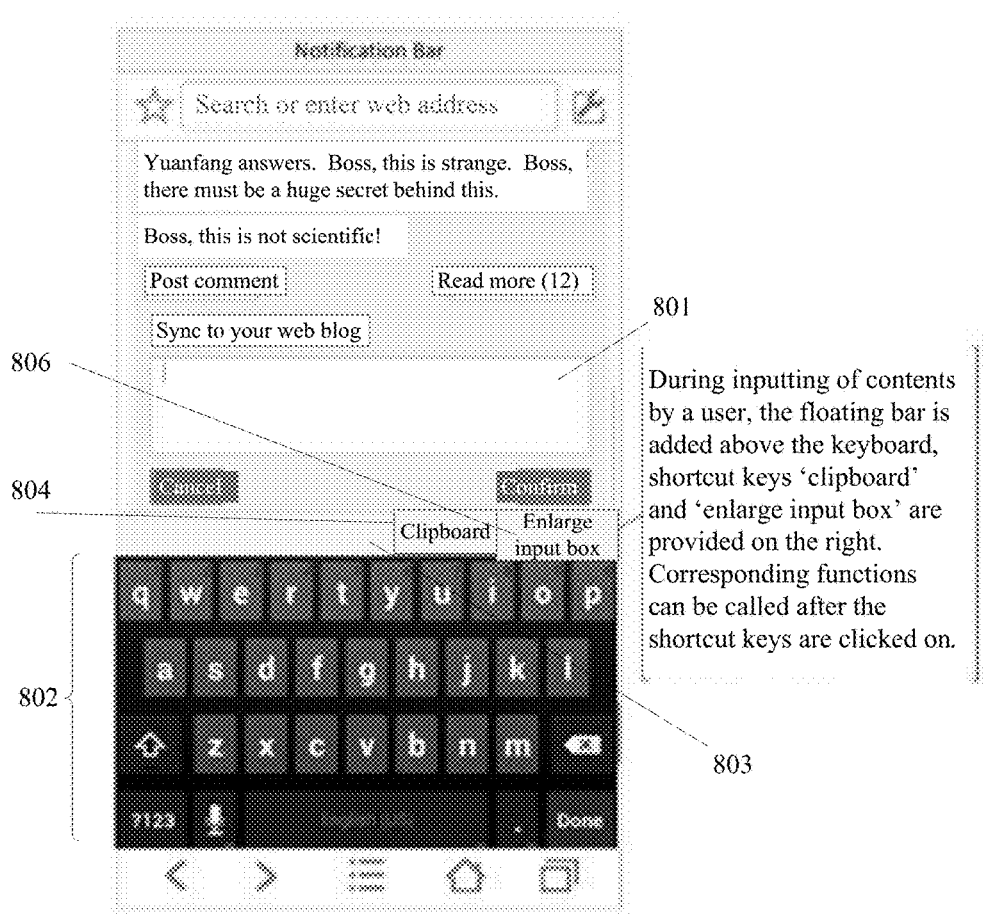

For example, FIGS. 8A-8B depict exemplary interfaces for calling out a clipboard on a mobile terminal in accordance with various disclosed embodiments. FIG. 8A depicts an interface having an input box 801. The input-method keyboard can be called out by an operation of the user clicking on the input box 801. Optionally, when the clipboard is empty, a notification 805 can be displayed to indicate that the clipboard has been emptied or cleared, as shown in FIG. 8A. FIG. 8B depicts the interface after the user clicks on the input box 801. The interface includes an input-method keyboard 802. An auxiliary entrance to the clipboard can be provided in the form of a floating bar 803, as shown in FIG. 8B. The floating bar 803 can include a 'clipboard' button 804 and an optional 'enlarge input box' button 806, for appropriate functions.

In one embodiment, an interactive process or method for presenting clipboard contents on a mobile terminal is provided. In an exemplary process, when a user copies an item in any application program in the system of the mobile terminal, a clipboard can record the copied item (e.g., information, paragraph, etc.) from the copying operation. When the user calls out the clipboard via an input box, the user can click on any one recorded item on the clipboard, to quickly fill the corresponding item or information into the current input box.

Figure 9A:
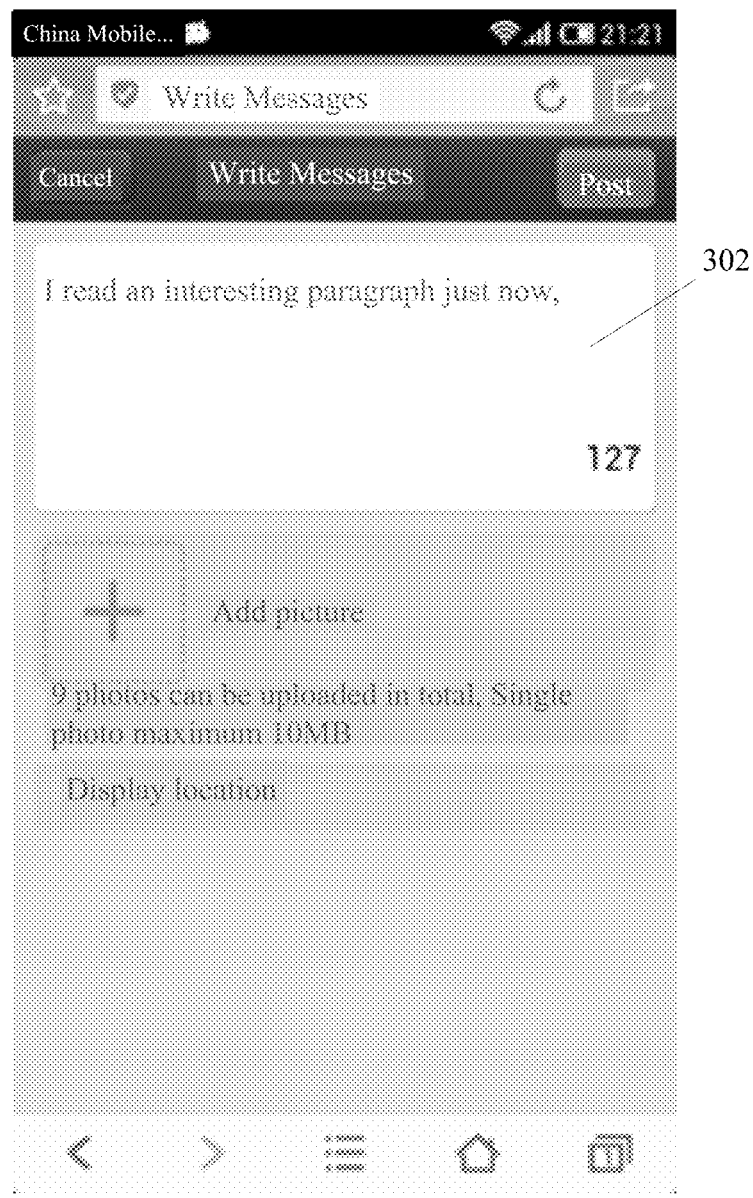
FIGS. 9A-9B depict exemplary interfaces during a process for presenting clipboard contents on a mobile terminal in accordance with various disclosed embodiments.
Figure 9B:
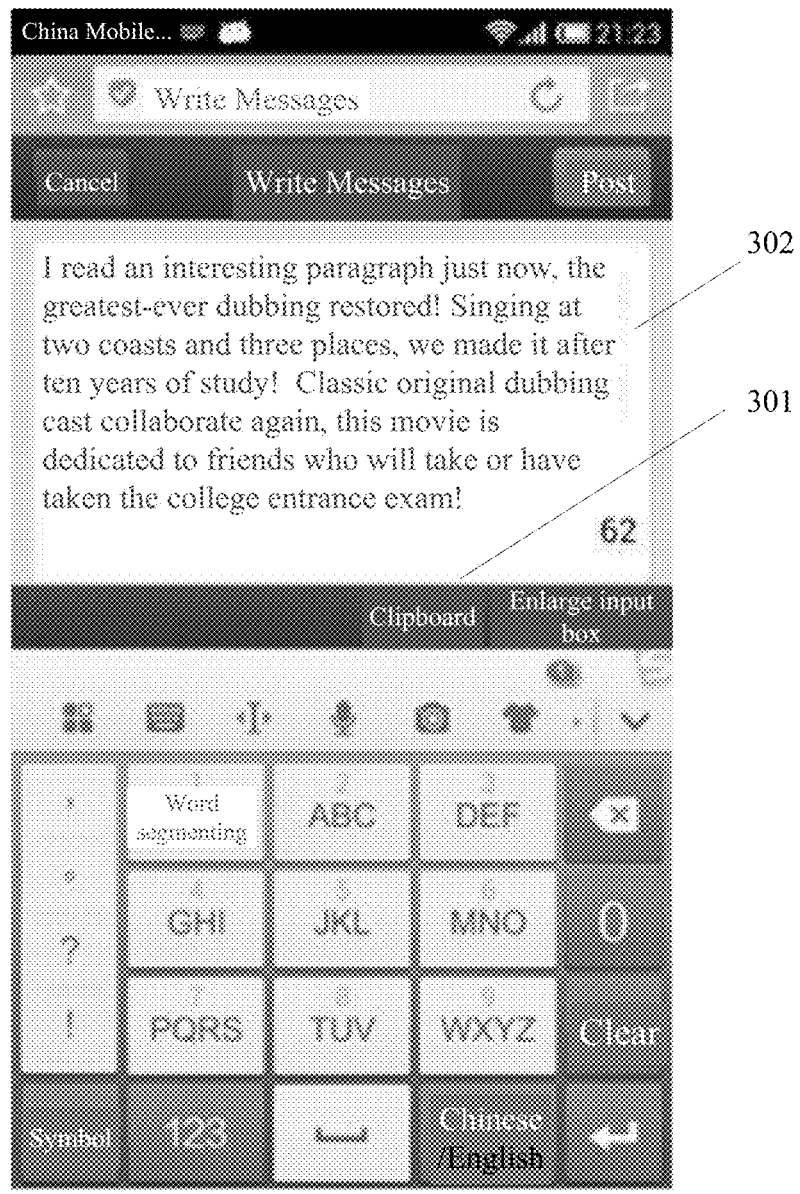

For example, FIGS. 9A-9B depict exemplary interfaces during a process for presenting clipboard contents on a mobile terminal in accordance with various disclosed embodiments. A process for presenting clipboard contents on a mobile terminal can be sequentially described by FIG. 9A, FIG. 3, FIG. 4, and FIG. 9B.

FIG. 9A depicts an interface having an input box 302. FIG. 3 depicts an interface after the user calls out an input-method control 300. As shown in FIG. 3, the input-method control 300 is displayed on the interface and includes a clipboard function key 301. The clipboard function key 301 can be clicked on, to display a clipboard. FIG. 4 depicts the interface that presents a clipboard 304 containing multiple copying items. The user can click on a copying item, e.g., the copying item 305 on the clipboard 304. to paste the copying item 305 into the input box 302. To paste a selected copying item (such as the copying item 305) into the input box 302, the user can send any appropriate preset paste-triggering signal including, e.g., single-clicking or double-clicking on the selected copying item, long pressing on the selected copying item, or any other appropriate preset signal for indicating the user's command for pasting the selected copying item. FIG. 9B depicts the interface after the content of the copying item 305 is pasted into the input box 302.

Thus, in certain embodiments, a method for calling out a clipboard on a mobile device is provided. A clipboard function key can be bound with, i.e., attached with, an input-method control. When a cursor is in an input box, a user can activate and call out an input-method control. When the user activates the input-method control, the user usually has a clear intention of inputting contents in the input box. The clipboard can thus appear at the time when the user desires to input contents in the input box.

Further, in certain embodiments, a method for interactively using a clipboard on a mobile terminal is provided. The clipboard can store multiple copying items, for a user to select and use. Optionally, the clipboard can have a function of being cleared, i.e., being emptied. Optionally, the clipboard can have a function of deleting copying items one at a time, such that the user can easily manage the copying items and his/her privacy.

Part or all of the steps in the methods in accordance with various embodiments can be implemented using a program/software to instruct related hardware. The software modules can be stored in a (non-transitory) computer-readable storage medium including, e.g., Read-Only Memory (ROM), RAM, internal memory, register, computer hard disk, removable disk, CD-ROM, optical disk, floppy disk, or any other appropriate storage medium.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed to methods and apparatus for presenting clipboard contents on a mobile terminal can be used in a variety of mobile device applications that involve inputting information. The mobile device applications can include, but are not limited to, inputting information on a mobile phone, a tablet computer, a personal digital assistant, a POS (point of sales), a car-carried-computer, or any other desired terminal devices.

Using the methods in accordance with various embodiments, a clipboard function key can be directly bound with the input-method control. When an input-method-control call-out request is received, an input-method control including a clipboard function key can be displayed. When a triggering signal for triggering the clipboard function key is received, a clipboard containing one or more copying items can be displayed.

In certain embodiments, an input-method control including a clipboard function key can be called out directly by single-clicking on an edit box. Thus, the number of user operations for calling out a clipboard can be reduced.

Further, copying and pasting via a clipboard can by itself be a method for inputting information. An inputting or editing operation can usually be performed via the input-method control after a pasting operation is performed. In addition, during the inputting or editing operation, copying items often need to be selected from the clipboard to perform a pasting operation. Therefore, by directly binding the clipboard function key with the input-method control, the number of user operations can be further reduced. Thus, efficiency of a user for operating a mobile terminal can be improved, the number of user operations can be reduced, and lifetime or battery lifetime of the mobile terminal can accordingly be extended.

Further, before a copying item is saved on the clipboard, it can be first determined whether the clipboard satisfies a condition for loading the copying item. The condition can be whether the number of copying items on the clipboard is less than or equal to a preset total number. When the clipboard does not satisfy the condition for loading the copying item, at least one copying item can be deleted from the clipboard according to a pre-set rule. Thus, the copying item can be saved on the clipboard after the clipboard satisfies the condition for loading the clipping information item. Thus, the efficiency of copying and pasting using the clipboard can be improved. Accordingly, the efficiency of the user selecting multiple copying items on the clipboard can be further improved. The number of sliding operations, when the user looks for the copying items, can be reduced. Thus, lifetime of the mobile terminal can be further extended.

What is claimed is:

1. A method for of presenting clipboard contents on a mobile terminal, comprising:
   receiving an input-method-control call-out request from a user on a touch screen of the terminal;
   displaying an input-method control comprising an input-box for inputting text on the touch screen based on the received input-method-control call-out request;
   in response to the input box is long pressed by the user, providing a clipboard function key on the input-method control;
   in response to receiving a triggering signal to select the clipboard function key, displaying a clipboard containing one or more copying items, comprising:
      when a copying request is received, obtaining a copying item that is requested;
      determining whether the obtained copying item has a word count less than or equal to a preset length threshold;
         when the obtained copying item has the word count less than or equal to the preset length threshold, adding the copying item to the clipboard and re-displaying the clipboard; and when the obtained copying item has the word count greater than the preset length threshold, aborting the copying request;

determining whether a number of the one or more copying items on the clipboard is greater than a preset display threshold;

when the number of the one or more copying items on the clipboard is greater than the preset display threshold, deleting at least one of the one or more copying items from the clipboard, and displaying a set of copying items having a number of the copying items equal to the preset display threshold of the clipboard.

2. The method according to claim 1, wherein, after displaying the clipboard containing the one or more copying items, the method further comprises:

when the input box for inputting text is in an edit-activated state, and when the copying item on the clipboard receives a preset paste-triggering signal, pasting the copying item into the input box.

3. The method according to claim 2, wherein the input box comprises an input box on a webpage, or a text-edit input box.

4. The method according to claim 1, wherein, after receiving the input-method-control call-out request, the method further comprises:

displaying the input-method control comprising an input-box function key;

receiving a triggering signal for triggering the input-box function key; and enlarging the input box.

5. The method according to claim 1, wherein, after displaying the clipboard containing the one or more copying items, the method further comprises:

when the copying item on the clipboard receives a preset delete-triggering signal:
deleting the copying item from the clipboard; and
re-displaying the clipboard.

6. The method according to claim 1, wherein, after displaying the clipboard containing the one or more copying items, the method further comprises:

when the clipboard receives a preset clear-triggering signal:
deleting all of the one or more copying items on the clipboard; and
re-displaying the clipboard.

7. The method according to claim 1, wherein the displaying of the clipboard containing the one or more copying items further comprises:

when the number of the one or more copying items on the clipboard is not greater than the preset display threshold, displaying all of the one or more copying items of the clipboard.

8. The method according to claim 1, wherein the displaying of the clipboard containing the one or more copying items further comprises:

sorting the one or more copying items on the clipboard in a reverse order according to a copying time of the one or more copying items to provide sorted copying items;

when the number of the one or more copying items on the clipboard is not greater than the preset display threshold, displaying all of the one or more copying items of the clipboard.

9. The method according to claim 1, wherein when the input box is long pressed by the user, providing the clipboard function key, comprises:

when the input box is long pressed by the user, displaying a long press menu including a plurality of quick entrance options; and clicking a clipboard option in the plurality of quick entrance options to trigger the clipboard function key.

10. An apparatus of presenting clipboard contents on a mobile terminal, comprising:

a memory; and a processor coupled to the memory, wherein the processor is configured to:

receive an input-method-control call-out request from a user on a touch screen of the terminal;

display an input-method control comprising an input-box for inputting text on the touch screen based on the received input-method-control call-out request;

in response to the input box is long pressed by the user, provide a clipboard function key on the input-method control; and receive a triggering signal to select the clipboard function key and display a clipboard containing one or more copying items, comprising:

when a copying request is received, obtaining a copying item that is requested;

determining whether the obtained copying item has a word count less than or equal to a preset length threshold;

when the obtained copying item has the word count less than or equal to the preset length threshold, adding the copying item to the clipboard and re-displaying the clipboard; and when the obtained copying item has the word count greater than the preset length threshold, aborting the copying request;

determine whether a number of the one or more copying items on the clipboard is greater than a preset display threshold;

when the number of the one or more copying items on the clipboard is greater than the preset display threshold, delete at least one of the one or more copying items from the clipboard, and display a set of copying items having a number of the copying items equal to the preset display threshold of the clipboard.

11. The apparatus according to claim 10, wherein the processor is further configured:

when the input box for inputting text is in an edit-activated state, and when the copying item on the clipboard receives a preset paste-triggering signal, to paste the copying item into the input box.

12. The apparatus according to claim 10, wherein the input-method control further comprises an input-box function key, and the input box is an enlarged input box when the input-box function key is triggered.

13. The apparatus according to claim 10, wherein the processor is further configured to:

when the copying item on the clipboard receives a preset delete-triggering signal:
delete the copying item from the clipboard; and
re-display the clipboard.

14. The apparatus according to claim 10, wherein the processor is further configured to:

when the clipboard receives a preset clear-triggering signal:
delete all of the one or more copying items on the clipboard; and
re-display the clipboard.

15. The apparatus according to claim 10, wherein the processor is further configured:
   when the number of the one or more copying items on the clipboard is not greater than the preset display threshold, to display all of the one or more copying items of the clipboard.

16. The apparatus according to claim 10, wherein the processor is further configured:
   to sort the one or more copying items on the clipboard in a reverse order according to a copying time of the one or more copying items to provide sorted copying items;
   when the number of the one or more copying items on the clipboard is not greater than the preset display threshold, to display all of the one or more copying items of the clipboard.

* * * * *